US012589703B2

(12) United States Patent
McVan et al.

(10) Patent No.: US 12,589,703 B2
(45) Date of Patent: Mar. 31, 2026

(54) VEHICLE GRILL MOUNTING STRUCTURE FOR FLOAT-MOUNTING A VEHICLE ELEMENT

(71) Applicant: Honda Motor Co., Ltd., Tokyo (JP)

(72) Inventors: David McVan, Dublin, OH (US);
Timothy J. Rupp, Dublin, OH (US);
David J. Rose, West Mansfield, OH
(US); Hirofumi Takemoto, Dublin, OH
(US); Hunter Todd May, Columbus,
OH (US)

(73) Assignee: Honda Motor Co., Ltd., Tokyo (JP)

( * ) Notice: Subject to any disclaimer, the term of this patent is extended or adjusted under 35 U.S.C. 154(b) by 498 days.

(21) Appl. No.: 18/182,624

(22) Filed: Mar. 13, 2023

(65) Prior Publication Data

US 2024/0308440 A1 Sep. 19, 2024

(51) Int. Cl.
*B60R 19/52* (2006.01)
*B60R 13/04* (2006.01)

(52) U.S. Cl.
CPC .............. *B60R 13/04* (2013.01); *B60R 19/52* (2013.01); *B60R 2019/525* (2013.01)

(58) Field of Classification Search
CPC ....... B60R 13/005; B60R 13/04; B60R 19/52; B60R 2019/525
USPC .............................................. 296/193.1, 1.08
See application file for complete search history.

(56) References Cited

U.S. PATENT DOCUMENTS

| | | | |
|---|---|---|---|
| 7,364,382 B2 | 4/2008 | Benedetti et al. | |
| 2006/0186681 A1* | 8/2006 | Elwell ..................... | B60R 13/00 |
| | | | 296/1.08 |
| 2009/0140549 A1* | 6/2009 | Doroghazi ............ | B60R 13/005 |
| | | | 296/193.1 |
| 2013/0107046 A1* | 5/2013 | Forgue ................... | B60R 19/52 |
| | | | 348/148 |
| 2016/0137144 A1* | 5/2016 | Quintero Perez ...... | B60K 13/06 |
| | | | 40/200 |
| 2019/0071030 A1* | 3/2019 | Bober ................... | B60R 13/005 |
| 2021/0276496 A1* | 9/2021 | Fattouche .............. | B60R 13/00 |
| 2023/0202404 A1* | 6/2023 | Nakayama ............. | G01S 7/027 |
| | | | 296/1.08 |
| 2024/0308440 A1* | 9/2024 | Mcvan .................... | B60R 19/52 |
| 2025/0121788 A1* | 4/2025 | Kirigaya ................ | B60R 19/52 |
| 2025/0256642 A1* | 8/2025 | Dassanayake ..... | H10H 29/8508 |
| 2025/0263026 A1* | 8/2025 | Toyoyama ........... | B60R 13/005 |

FOREIGN PATENT DOCUMENTS

| | | |
|---|---|---|
| CN | 206306961 U | 7/2017 |
| CN | 206812917 U | 12/2017 |
| CN | 111806579 A | 10/2020 |

(Continued)

*Primary Examiner* — Gregory A Blankenship
(74) *Attorney, Agent, or Firm* — Mark E. Duell; Rankin, Hill & Clark LLP

(57) ABSTRACT

A vehicle grill mounting structure for float-mounting a vehicle element includes a bracket body, at least one mounting structure, and at least one anti-rotation tab. The at least one mounting structure extends away from the bracket body for securing the bracket body in a floating orientation that is spaced apart from other vehicle components. The at least one anti-rotation tab extends away from the bracket body and is spaced apart from the at least one mounting structure to inhibit rotation of the bracket body.

17 Claims, 8 Drawing Sheets

(56)            References Cited

FOREIGN PATENT DOCUMENTS

| CN | 212373532 | U | 1/2021 |
|----|-----------|---|--------|
| CN | 213384118 | U | 6/2021 |
| CN | 111002933 | B | 9/2021 |
| CN | 218055371 | U | 12/2022 |
| EP | 2733020 | B1 | 10/2015 |
| JP | 2004352002 | A | 12/2004 |
| JP | 3711856 | B2 | 11/2005 |
| KR | 970002719 | Y1 | 4/1997 |

* cited by examiner

VEHICLE GRILL MOUNTING STRUCTURE FOR FLOAT-MOUNTING A VEHICLE ELEMENT

BACKGROUND

Emblems are ubiquitous on vehicles. They are often used to indicate the vehicle manufacturer, the vehicle model, a brand, logo or badge, a particular feature of the vehicle (e.g., all-wheel drive), etc. Traditional emblems are securely mounted to the skin of the vehicle (e.g., on a rear bumper of the vehicle), often with adhesive or clips. In such a mounting, no bracket is typically employed and the emblem sits flush on the vehicle's surface.

BRIEF DESCRIPTION

According to one aspect, an emblem mounting structure for float-mounting an emblem in a vehicle grill includes a bracket body, and at least one mounting structure extending from the bracket body for fixably mounting the bracket body to the vehicle grill. The emblem mounting structure further includes at least one anti-rotation structure extending from the bracket body to inhibit rotation of the bracket body. Each of the at least one anti-rotation structure has a distal end movable relative to the vehicle grill.

According to another aspect, a vehicle grill mounting structure for float-mounting a vehicle element includes a bracket body, at least one mounting structure, and at least one anti-rotation tab. The at least one mounting structure extends away from the bracket body for securing the bracket body in a floating orientation that is spaced apart from other vehicle components. The at least one anti-rotation tab extends away from the bracket body and is spaced apart from the at least one mounting structure to inhibit rotation of the bracket body.

According to a further aspect, a vehicle grill assembly having an emblem float mounted within a grill aperture includes a vehicle grill defining a plurality of grill apertures including the grill aperture in which the emblem is float mounted. The assembly also includes a bracket having a bracket body on which the emblem is disposed, at least one mounting structure extending from the bracket body to the vehicle grill, and at least one anti-rotation structure extending from the bracket body at a location spaced apart from the at least one mounting structure.

DETAILED DESCRIPTION

It should, of course, be understood that the description in drawings herein are merely illustrative and that various modifications and changes can be made in the structures disclosed without departing from the present disclosure. Spatially relative terms may be used to describe an element and/or features relationship to another element(s) and/or feature(s) as, for example, illustrated in the figures. Moreover, any term of degree used herein, such as "substantially" and "approximately", means a reasonable amount of deviation of the modified word is contemplated such that the end result is not significantly changed.

Figure 1:
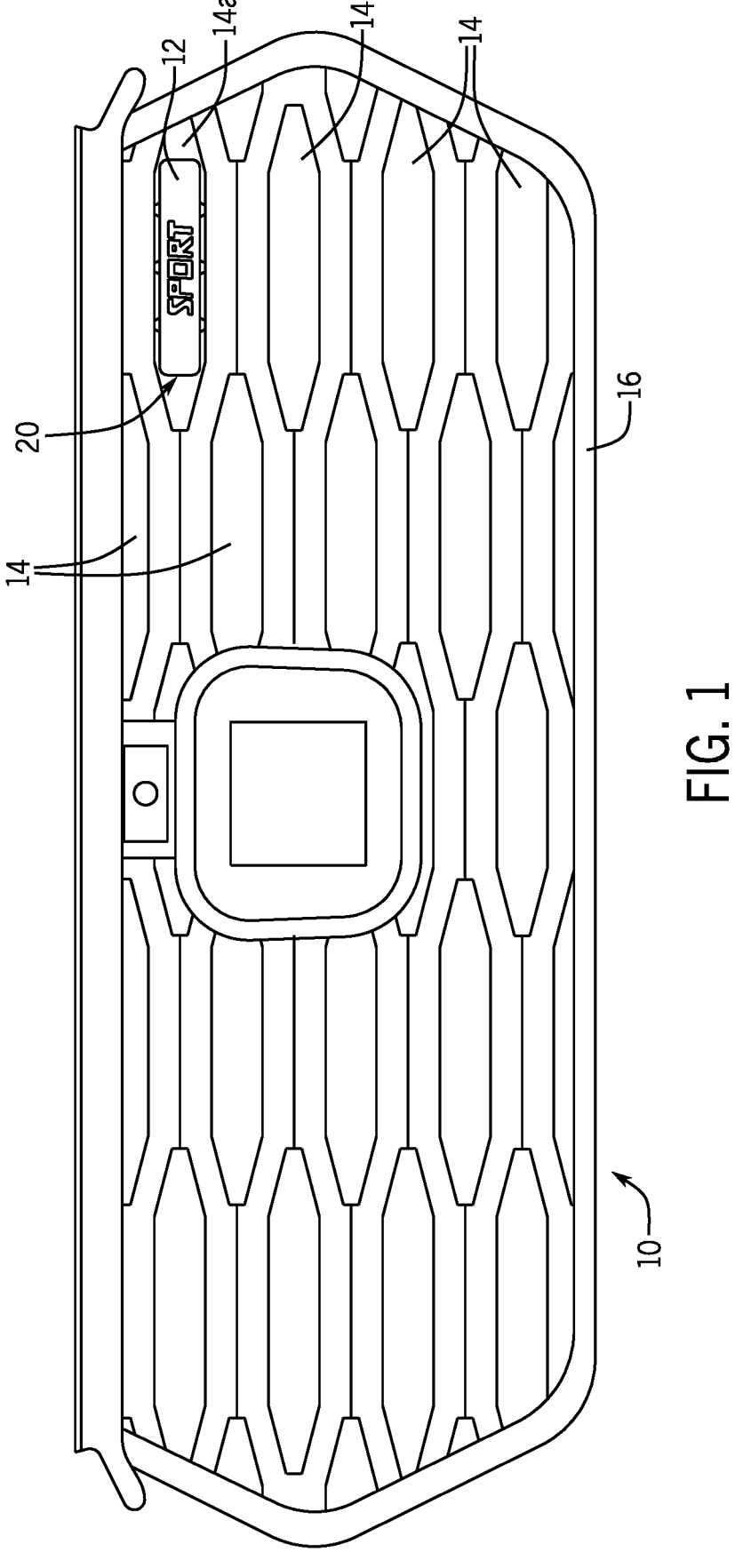
FIG. 1 is a partial schematic view of a vehicle grill assembly having an emblem float mounted within a grill aperture according to one aspect of the present disclosure.

Referring now to the drawings, wherein like numerals refer to like parts throughout the several views, FIG. 1 schematically illustrates a vehicle grill assembly 10 having a vehicle element, such as the illustrated emblem 12, float mounted within a particular grill aperture 14a according to one aspect of the present disclosure. As shown, and with additional reference to FIG. 2, the vehicle grill assembly 10 includes a vehicle grill 16 defining a plurality of grill apertures 14, including the grill aperture 14a in which the emblem 12 is float mounted. The vehicle grill assembly 10 further includes a vehicle grill mounting structure 20, also referred to herein as an emblem mounting structure 20, for float-mounting the emblem 12 in the vehicle grill 16.

Figure 3:
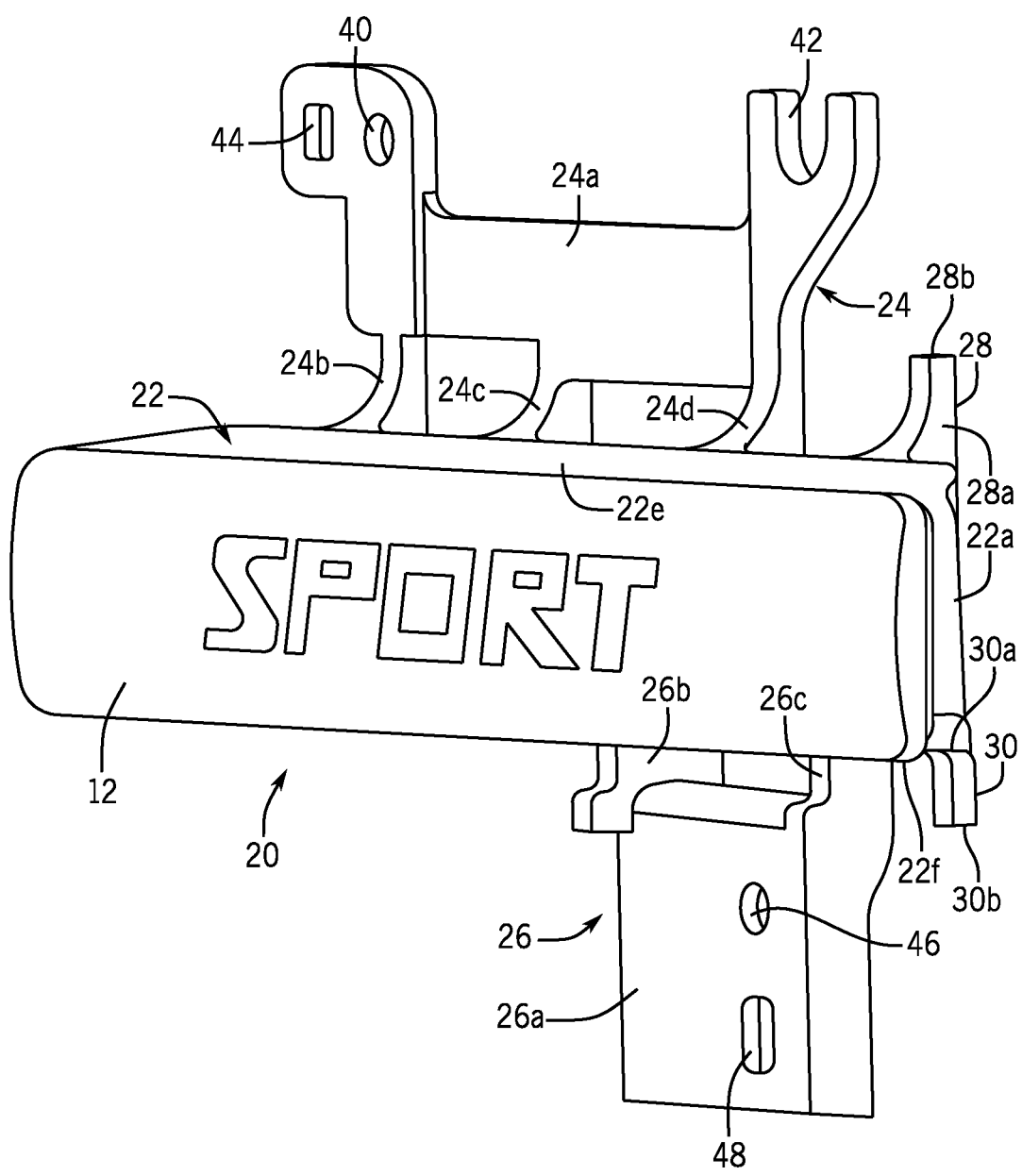
FIG. 3 is an isolated perspective view of the emblem mounting structure of FIG. 2 shown with the emblem mounted thereto.
Figure 4:
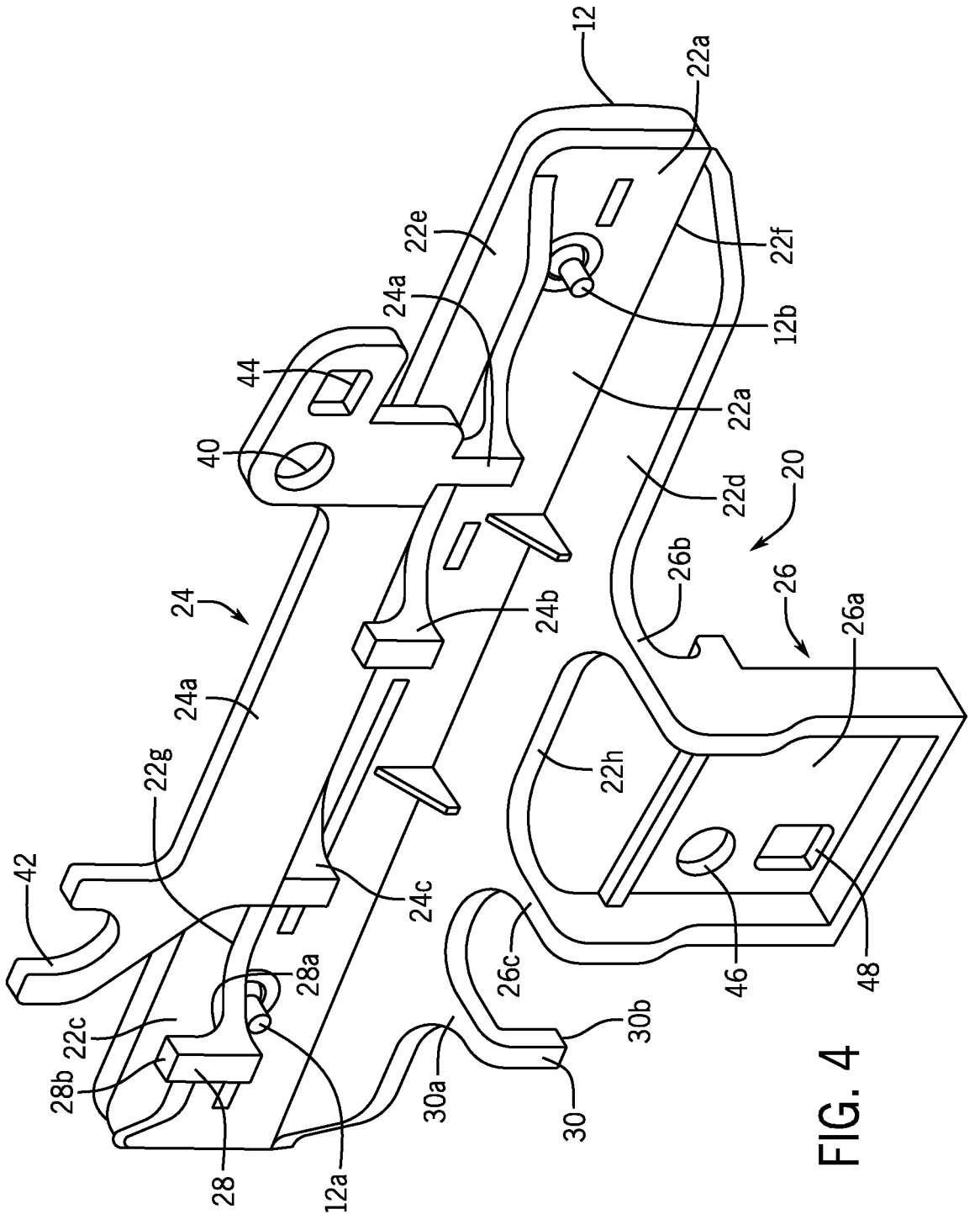
FIG. 4 is an isolated rear perspective view of the emblem mounting structure of FIG. 3 shown with the emblem removed.
Figure 5:
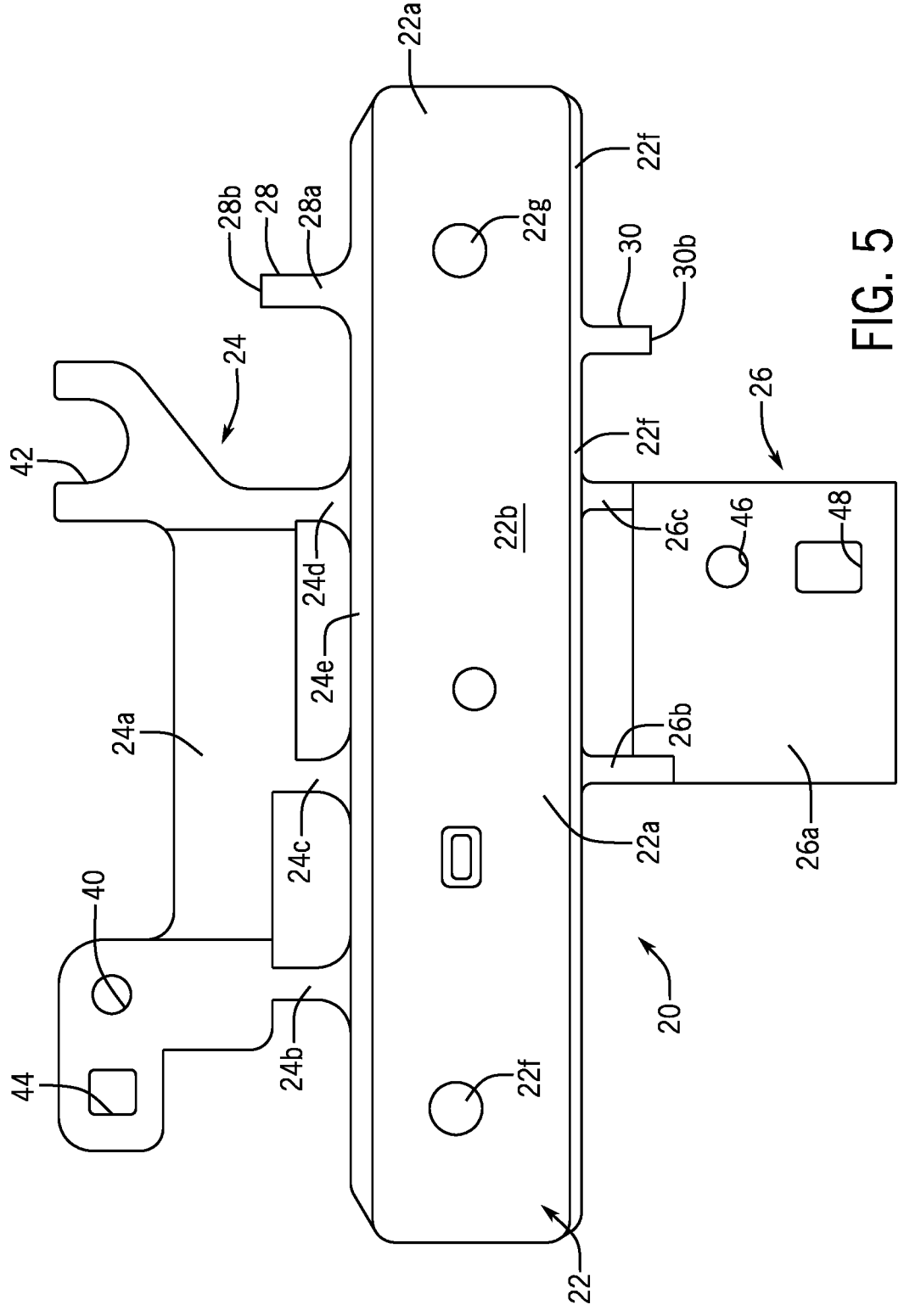
FIG. 5 is a front elevation view of the emblem mounting structure of FIG. 3 also shown with the emblem removed.

With additional reference to FIGS. 3, 4 and 5, the emblem mounting structure 20 includes a bracket body 22, at least one mounting structure (for example, first and second mounting tab structures 24, 26) extending from the bracket body 22 for fixedly mounting the bracket body 22 to the vehicle grill 16 and at least one anti-rotation structure or tab (for example, first and second anti-rotation tabs 28, 30) extending from the bracket body 22 to inhibit rotation of the bracket body 22 as will be described in more detail below. In particular, the at least one mounting structure (first and second mounting tab structures 24, 26) extends away from the bracket body 22 for securing the bracket body 22 in a floating orientation that is spaced part from other vehicle components, including the vehicle grill 16 and a vehicle grill air guide 32 (FIG. 6) for example. The at least one anti-rotation structure also extends away from the bracket body 22 but is laterally spaced apart from the at least one mounting structure (first and second mounting tab structures 24, 26) to inhibit rotation of the bracket body 22.

In particular, the at least one mounting structure includes a first or upper mounting tab structure 24 and a second or lower mounting tab structure 26. Each of these extends from the bracket body 22 to the vehicle grill 16. In particular, the first mounting tab structure 24 extends in a first upper direction away from the bracket body 22 and the second mounting tab structure 26 extends in a second downward direction away from the bracket body 22 and opposite the first upper direction. Specifically, first mounting tab structure 24 extends upwardly in the first direction to the grill 16 from the bracket body 22 and is secured to the grill 16. Similarly, the second mounting tab structure 26 extends downwardly to the grill 16 from the bracket body 22 and is secured to the grill 16.

The at least one anti-rotation structure includes a first or upper anti-rotation tab 28 and a second or lower anti-rotation tab 30. Each of the anti-rotation tabs 28, 30 extends from the bracket body 22 at a location laterally spaced apart from the at least one mounting structure (structures 24, 26 in the illustrated embodiment). The first anti-rotation tab 28 extends upwardly to or toward the grill 16 from the bracket body 22 but at a laterally spaced apart location from the first mounting tab structure 24 and is not secured to the grill 16. The second anti-rotation tab 30 extends downwardly to or toward the grill 16 but at a laterally spaced apart location from the second mounting tab structure 26 and is not secured to the grill 16.

More specifically, and as best shown in FIG. 4, the bracket body 22 can include a main wall portion 22*a* defining a forward surface 22*b* to which the emblem 12 is mounted. The bracket body can also include upper and lower flange portions 22*c*, 22*d* extending rearwardly from, respectively, upper and lower edges 22*e*, 22*f* of the main wall portion 22*a*. The first mounting tab structure 24 and the first anti-rotation tab 28 both extend upwardly from the upper flange portion 22*c* of the bracket body 22, and particularly from or near a rear edge 22*g* of the upper flange portion 22*c*. The second mounting tab structure 26 and the second anti-rotation tab 30 both extend downwardly from the lower flange portion 22*d* of the bracket body 22, and particularly from or near a rear edge 22*h* of the lower flange portion 22*d*. The spacing of the main wall portion 22*a* relative to the rear edges 22*e*, 22*f* of the flange portions 22*c*, 22*d* further provides the floating effect to the emblem 12 mounted on the bracket body 22.

Figure 2:
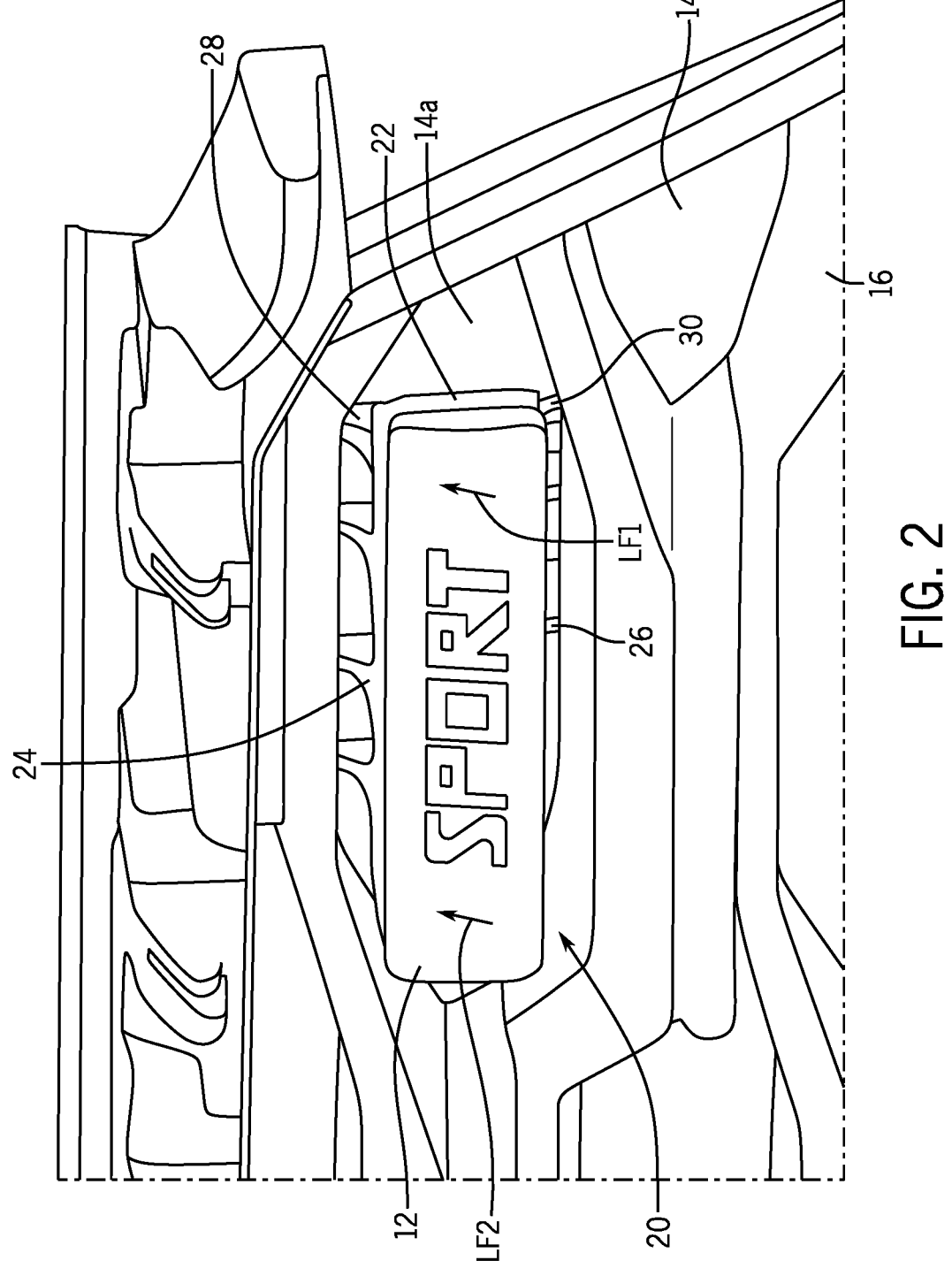
FIG. 2 is an enlarged partial perspective view of the vehicle grill assembly of FIG. 1 showing the emblem float mounted within the grill aperture by an emblem mounting structure.

As will be described in more detail below, and with additional reference to FIG. 6, the at least one anti-rotation structure, and specifically the first anti-rotation tab 28, is arranged to engage the air guide 32 disposed immediately rearwardly of the vehicle grill 16 of the vehicle grill 16 when the bracket body 22 receives a first load force thereon, such as illustrated load force LF1 (FIG. 2). In particular, the first anti-rotation tab 28 engages the air guide 32 when the load force LF1 is directed onto the bracket body 22 on a side thereof that is disposed on the same side as the at least one anti-rotation structure, i.e., the anti-rotation tab 28, relative to the at least one mounting structure, structures 24, 26 in the illustrated embodiment (i.e., a first load force location). This prevents or inhibits rotation of the bracket body 22 due to the load force LF1.

The at least one anti-rotation structure, and specifically the second anti-rotation tab 30, is arranged to engage a portion 16*a* of the vehicle grill 16 disposed immediately forward of second anti-rotation tab 30 when the bracket body 22 receives a second load force, such as illustrated load force LF2 (FIG. 2). In particular, In the second anti-rotation tab 30 engages the grill 16, and particularly the portion 16*a*, when the load force LF2 is directed onto the bracket body 22 on a side thereof oppositely disposed relative to the at least one anti-rotation structure, i.e., the anti-rotation tab 30, relative to the at least one mounting structure, structures 24, 26 in the illustrated embodiment (i.e., a second load force location). This prevents or inhibits rotation of the bracket body 22 due to the load force LF2.

1. The at least one mounting tab structure (e.g., first and second mounting tab structures 24, 26) defines at least one aperture (for example, apertures 40, 42, 44, 46, and 48 in the illustrated embodiment) for receiving a fastener, such as a screw, clip, locating element or the like therethrough to align and/or secure the bracket body 22 with and/or to the vehicle grill 16. In the illustrated embodiment, each of the at least one mounting tab structure (i.e., tab structures 24, 26) can include a tab body portion (e.g., tab body portions 24*a*, 26*a*) in which the at least one tab aperture (e.g., apertures 40, 42, 44, 46, 48) is defined and at least one spacing rib (e.g., spacing ribs 24*b*, 24*c*, 24*d* on the tab structure 24 and spacing ribs 26*b*, 26*c* on the tab structure 26) connecting the at least one mounting structure to the bracket body 22 in spaced relation to the bracket body 22 for providing a floating effect to the bracket body 22 within the grill aperture 14*a* of the vehicle grill 16. In one embodiment, the tab body portion (e.g., tab body portions 24*a*, 26*a*) is spaced apart from the bracket body 22 by a spacing rib (e.g., spacing ribs 24*b*, 24*c*, 24*d* for tab body portion 24*a* and spacing ribs 26*b*, 26*c* for tab body portion 26*a*) having a width less than one quarter a width of the tab body (e.g., tab body portions 24*a* and 26*a*).

Figure 7:
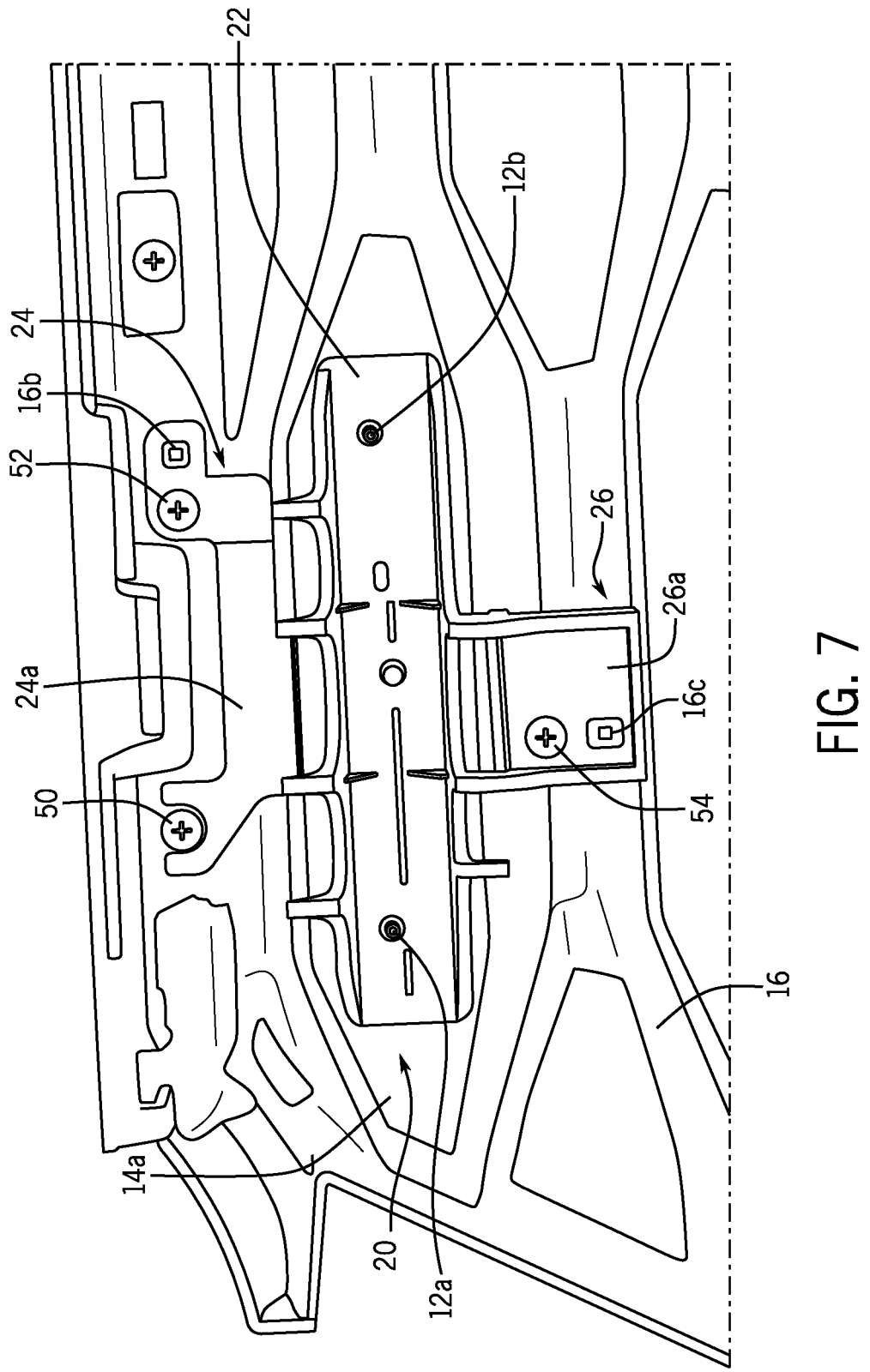
FIG. 7 is a partial rear elevation view showing the emblem mounting structure affixed to a vehicle grill of the grill mounting structure of FIG. 1.

In particular, in the illustrated embodiment and with further reference to FIG. 7, the first mounting tab structure 24 includes a first tab body portion 24*a* that defines apertures 40, 42 for receiving fasteners 50, 52, which can be screws, therethrough to secure the first mounting tab structure 24 to the vehicle grill 16. The second tab mounting structure 26 includes a second tab body portion 26*a* that defines aperture 44 for receiving another fastener 54, which can also be a screw, therethrough to secure the second mounting tab structure 26 to the vehicle grill 16. Additionally, the first tab body portion 24*a* can define an alignment aperture 46 and the second tab body portion 26*a* can define an alignment aperture 48, both provided for receiving alignment portions or locating elements 16*b*, 16*c* of the grill 16 for aligning the bracket body 22 relative to the grill 16 prior to installation of the fasteners 50, 52, 54.

In addition, the first mounting tab structure 24 includes at least one first tab spacing rib (e.g., ribs 24*b*, 24*c*, 24*d*) connecting the first tab body portion 24*a* to the bracket body 22 in spaced apart relation to the bracket body 22 for further providing the floating effect to the bracket body 22 relative to the vehicle grill 16. Similarly, the second mounting tab structure 26 includes at least one second tab spacing rib (e.g., ribs 26*b*, 26*c*) connecting the second tab body portion 26*a* to the bracket body 22 in spaced apart relation to the bracket body 22 for also providing the floating effect to the bracket body 22 relative to the vehicle grill 16. In particular, in the illustrated embodiment, three spacing ribs 24*b*, 24*c*, 24*d* connect the first tab body portion 24*a* to the bracket body 22 and two spacing ribs 26*a*, 26*b* connect the second tab body portion 26*a* to the bracket body 22. It is to be appreciated that variations on the number of spacing ribs used to connect each tab body portion 24, 26 can vary. Also, it is to be appreciated by those skilled in the art that other arrangements are contemplated and the exact type, number, configuration, etc., of apertures can vary.

Figure 8:
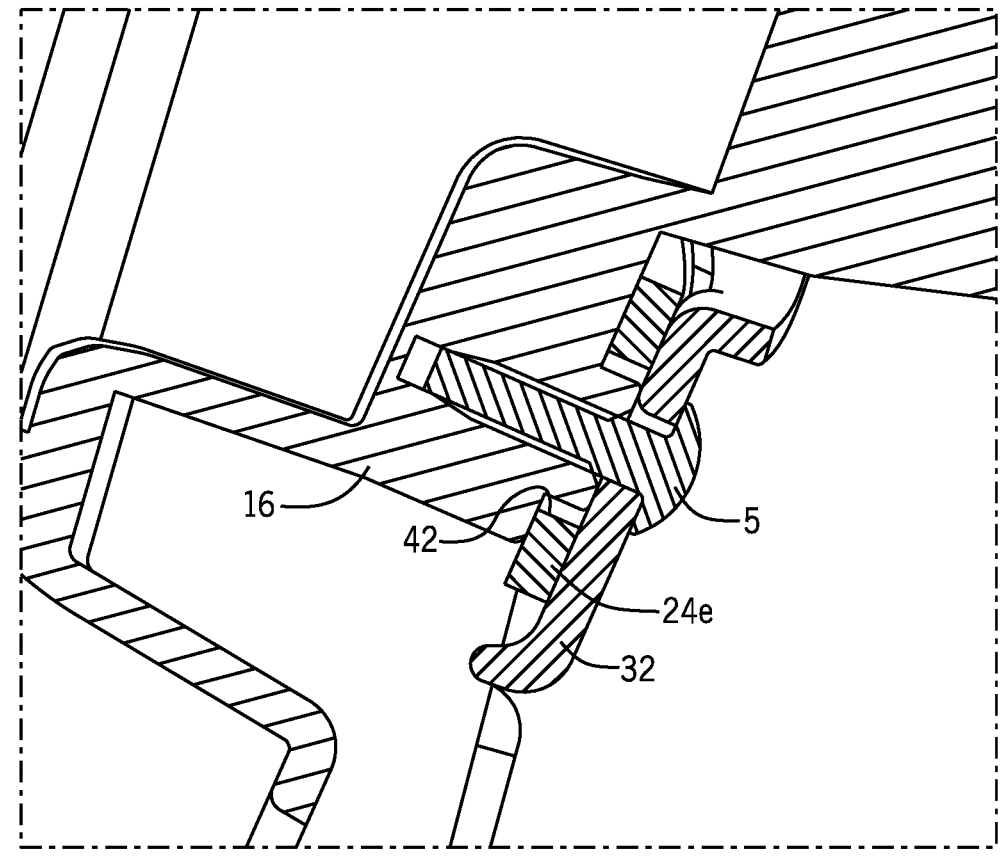
FIG. 8 is a partial cross section view showing one mounting location of the emblem mounting structure within the vehicle grill assembly of FIG. 1.

In the illustrated embodiment, the aperture 40 can receive a fastener, such as the illustrated screw 50, received therethrough for securing the bracket body 22, and particularly the first mounting tab structure 24 thereof, to the vehicle grill 16. Likewise, the aperture 42 can receive a screw 52 therethrough. With additional reference to FIG. 8, the screw 52 can sandwich the portion 24*e* defining the aperture 42 between the grill 16 and the vehicle grill air guide 32. The aperture 46 defined in the second mounting tab structure 26, and particularly the second tab body portion 26*a* thereof, can receive screw 54 therethrough for securing the second tab body portion 26*a* to the vehicle grill 16. The locating elements 16*b*, 16*c* can be integrally molded with the grill 16 and can be received through the apertures 44, 46 for purposes of guiding alignment between the bracket body 22 and the grill 16 prior to fastening the bracket body 22 with the screws 50, 52, 54.

In use, the first anti-rotation tab 28 is arranged relative to the vehicle grill 16 so that the first anti-rotation tab 28 engages the air guide 32 to prevent rotation of the bracket body 22 when a second load force LF1 is received on the bracket body 22, or on the emblem 12, in the inward direction. As shown best in FIG. 6, the vehicle grill air guide 32 is arranged or disposed rearward of the vehicle grill 16 for directing airflow into the vehicle grill 16 to a predefined location, such as toward a radiator (not shown). The second anti-rotation tab 30 is arranged relative to the vehicle grill 16 so that the second anti-rotation tab 30 engages the portion 16a of the vehicle grill 16 to prevent rotation of the bracket body 22 when the second load LF2 force is received on the bracket body 22, or on the emblem, in an inward direction. Specifically, the second anti-rotation tab 30 engages the portion 16a of the grill 16 when the load force LF2 is applied to the emblem 12.

As shown, the first anti-rotation tab 28 is laterally spaced apart from the first mounting tab structure 24 in a first lateral direction (to the right in FIG. 5) and the first load force LF1 is applied to the bracket body 22 at a location spaced apart from the first mounting tab structure 24 in the first lateral direction. The second anti-rotation tab 30 is laterally spaced apart from the lower mounting tab structure 26 in the first lateral direction and the second load force LF2 is applied to the bracket body 22 at a location spaced apart from the second mounting tab structure 26 in a second lateral direction that is opposite the first lateral direction (to the left in FIG. 5).

As shown in FIG. 5, the first anti-rotation tab 28 has a proximal end 28a integral with the bracket body 22, particularly the flange portion 22c thereof, and a distal end 28b spaced apart from the bracket body 22. The distal end 28b is also spaced apart from the other vehicle components as shown in FIG. 6 unless a load force (such as load force LF1) is applied to the bracket body 22 to thereby forcibly move the distal end 28b into contact with the other vehicle components, such as the grill 16 or the air guide 32, for inhibiting rotation of the bracket body 22. Likewise, the second anti-rotation tab 30 has a proximal end 30a integral with the bracket body, particularly the flange portion 22d thereof, and a distal end 30b spaced apparat from the bracket body 22. The distal end 30b is also spaced apart from the other vehicle components as shown in FIG. 6 unless a load force (such as load force LF2) is applied to the bracket body 22 to thereby forcibly move the distal end 30b into contact with the other vehicle components, such as the grill 16 or the air guide 32, for inhibiting rotation of the bracket body 22.

Figure 6:
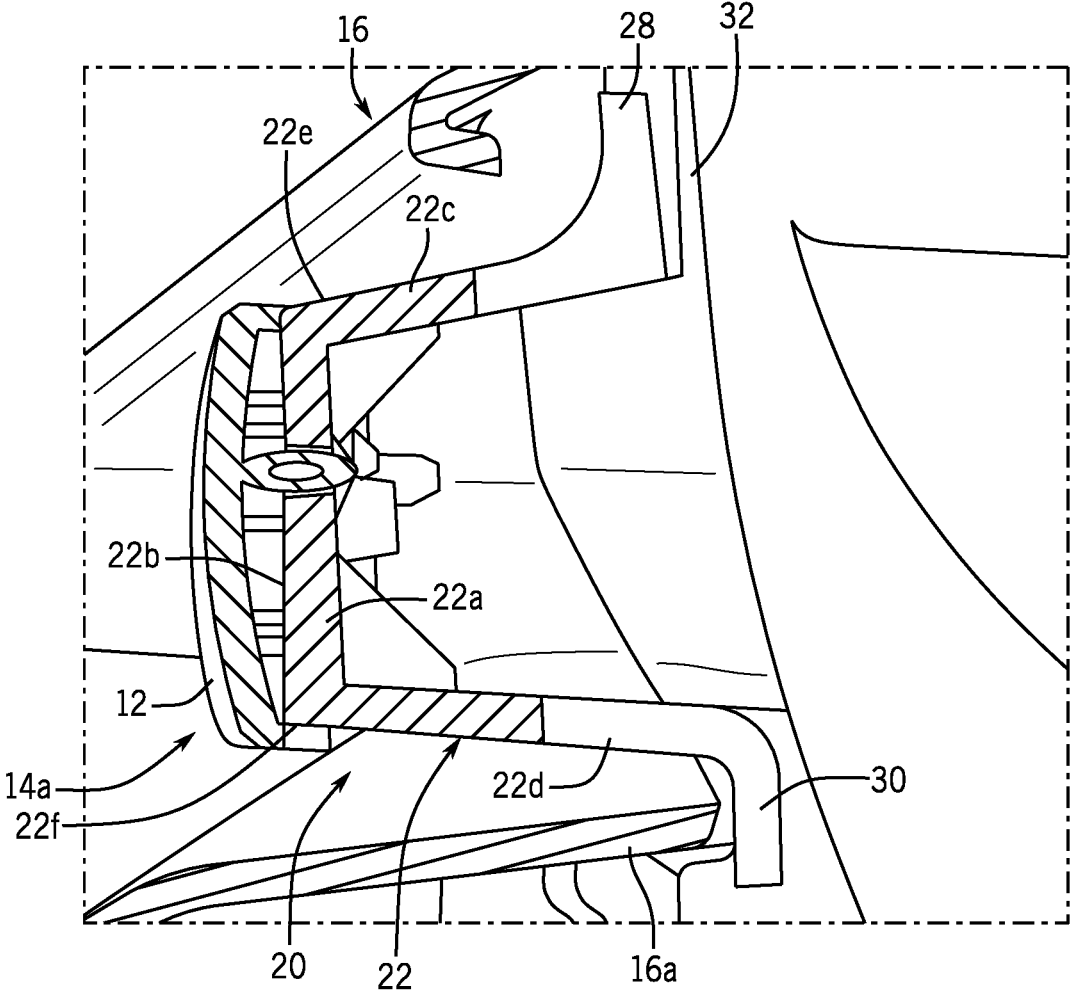
FIG. 6 is a partial schematic cross section view of the emblem mounting structure mounted within the grill aperture of the vehicle grill assembly of FIG. 1.

With specific reference now to FIGS. 4, 5 and 6, the forward surface 22b of the bracket body 22 is the surface to which the emblem 12 can be mounted. In the illustrated embodiment, the emblem 12 is a vehicle element that is mounted to the bracket body 22 via integrally formed tabs or protrusions 12a, 12b snap fit into corresponding apertures 24f, 24g defined in the main wall portion 22a. It is to be appreciated and understood by those skilled in the art that the emblem 12 could be alternatively provided and mounted. Also, optionally, the emblem 12 could be integrally formed into the bracket body 22, though this is not required.

In one embodiment, as best shown in FIG. 6, the forward surface 22b is oriented at an acute angle greater than 0° and less than 10° relative to a vertical axis for orienting the emblem 12 in a slightly angled upward direction. More particularly, in a specific embodiment, the angle of the forward surface 22b can be between 2° and 4°. In a more specific embodiment, the angle can be 3.1° relative to vertical. By way of example, and as shown, the bracket body 22 can have a varying thickness to provide the angle for the forward surface 22b. For example, as shown, a lower end of the main wall portion 22a of the bracket body 22 as compared to an upper end of the main wall portion 22a of the bracket body 22 can be thicker to provide the inclination desired.

It will be appreciated that various of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. An emblem mounting structure for float-mounting an emblem in a vehicle grill, comprising:
   a bracket body;
   at least one mounting structure extending from the bracket body for fixedly mounting the bracket body to the vehicle grill; and
   at least one anti-rotation structure extending from the bracket body to inhibit rotation of the bracket body, wherein each of the at least one anti-rotation structure has a distal end movable relative to the vehicle grill, wherein the at least one anti-rotation structure includes:
   a first anti-rotation tab extending in a first direction away from the bracket body; and
   a second anti-rotation tab extending in a second direction from the bracket body that is opposite the first direction.

2. The emblem mounting structure of claim 1 wherein the at least one anti-rotation structure is spaced apart laterally from the at least one mounting structure on the bracket body.

3. The emblem mounting structure of claim 2 wherein the at least one anti-rotation structure is arranged to engage a portion of the vehicle grill when the bracket body receives a load force thereon.

4. The emblem mounting structure of claim 3 wherein the at least one anti-rotation structure engages the portion of the vehicle grill when the load force is directed onto the bracket body on a side thereof oppositely disposed than the at least one anti-rotation structure relative to the at least one mounting structure.

5. The emblem mounting structure of claim 1 wherein the first anti-rotation tab extends from the bracket body in a downward direction and the second anti-rotation tab extends from the bracket body in an upward direction.

6. The emblem mounting structure of claim 5 wherein the first anti-rotation tab is arranged relative to the vehicle grill so that the first anti-rotation tab engages a portion of the vehicle grill to prevent rotation of the bracket body when a first load force is received on the bracket body in an inward direction.

7. The emblem mounting structure of claim 6 wherein the second anti-rotation tab is arranged so that the second anti-rotation tab engages an air guide to prevent rotation of the bracket body when a second load force is received on the bracket body in the inward direction, wherein the air guide is disposed rearward of the vehicle grill.

8. The emblem mounting structure of claim 7 wherein the first anti-rotation tab is spaced apart from the at least one mounting structure in a first lateral direction and the first load force is applied to the bracket body at a location spaced apart from the at least one mounting structure in a second lateral direction that is opposite the first lateral direction.

9. The emblem mounting structure of claim 8 wherein the second anti-rotation tab is spaced apart from the at least one mounting structure in the first lateral direction and the second load force is applied to the bracket at a second load force location that is spaced apart from the at least one mounting structure in the first lateral direction.

10. The emblem mounting structure of claim 1 wherein the at least one mounting structure includes:

a first mounting tab structure extending in the first direction away from the bracket body, the first mounting tab structure defining at least one first tab aperture for receiving a fastener therethrough to secure the first mounting tab structure to the vehicle grill; and a second mounting tab structure extending in the second direction away from the bracket body, the second mounting structure defining at least one second tab aperture for receiving another fastener therethrough to secure the second mounting tab structure to the vehicle grill.

11. The emblem mounting structure of claim 1 wherein the at least one mounting structure includes:

a first mounting tab structure extending in a first direction away from the bracket body, the first mounting tab structure defining at least one first tab aperture for receiving a fastener therethrough to secure the first mounting tab structure to the vehicle grill; and a second mounting tab structure extending in the second direction away from the bracket body, the second tab mounting structure defining at least one second tab aperture for receiving another fastener therethrough to secure the second mounting tab structure to the vehicle grill.

12. The emblem mounting structure of claim 11 wherein at least one of:

the first mounting tab structure includes a first tab body portion in which the at least one first tab aperture is defined and at least one first tab spacing rib connecting the first tab body portion to the bracket body in spaced apart relation to the bracket body for providing a floating effect to the bracket body relative to the vehicle grill, and/or the second mounting tab structure includes a second tab body portion in which the at least one first second aperture is defined and at least one second tab spacing rib connecting the second tab body portion to the bracket body in spaced apart relation to the bracket body for providing a floating effect to the bracket body relative to the vehicle grill.

13. The emblem mounting structure of claim 1 further including:

at last one mounting tab structure extending away from the bracket body and defining at least one aperture for receiving a fastener therethrough to secure the bracket body to the vehicle grill, and wherein the at least one mounting tab structure includes a tab body portion in which the at least one aperture is defined and at least one spacing rib connecting the at least one mounting structure to the bracket body in spaced apart relation to the bracket body for providing a floating effect to the bracket body within a grill aperture of the vehicle grill.

14. The emblem mounting structure of claim 1 wherein the bracket body includes a forward surface to which the emblem is mounted, the forward surface oriented at an acute angle greater than zero degrees and less than 10 degrees relative to a vertical axis for orienting the emblem in a slightly angled upward direction.

15. A vehicle grill mounting structure for float-mounting a vehicle element, comprising:

a bracket body;

at least one mounting structure extending away from the bracket body for securing the bracket body in a floating orientation that is spaced apart from other vehicle components; and at least one anti-rotation tab extending from away from the bracket body and spaced apart from the at least one mounting structure to inhibit rotation of the bracket body, wherein the at least one anti-rotation tab has a proximal end integral with the bracket body and a distal end spaced apart from the bracket body, the distal end spaced apart from the other vehicle components unless a load force is applied to the bracket body to thereby forcibly move the distal end into contact with the other vehicle components for inhibiting rotation of the bracket body.

16. The vehicle grill mounting structure of claim 15 wherein the other vehicle components includes a vehicle grill and the at least one mounting structure includes a tab body portion defining an aperture through which a fastener is received to fixedly mount the tab body to the vehicle grill, the tab body portion spaced apart from the bracket body by a spacing rib having a width less than one quarter a width of the tab body.

17. A vehicle grill assembly having an emblem float mounted within a grill aperture, comprising:

a vehicle grill defining a plurality of grill apertures including said grill aperture in which said emblem is float mounted; and a bracket having a bracket body on which said emblem is disposed, at least one mounting structure extending from the bracket body to the vehicle grill, and at least one anti-rotation structure extending from the bracket body at a location spaced apart from the at least one mounting structure, wherein the at least one anti-rotation structure is a tab having a proximal end integral with the bracket body and a distal end spaced apart from the bracket body, the distal end spaced movable relative to the vehicle grill and spaced apart from the vehicle grill unless a load force is applied to the bracket body.

\* \* \* \* \*